Nov. 29, 1949  E. K. SMITH  2,489,938
HOT CATHODE GRID CONTROL GAS TUBE
Filed Sept. 24, 1948  2 Sheets-Sheet 1

INVENTOR.
E. K. Smith.
BY Neil L. Preston,
his ATTORNEY

Nov. 29, 1949  E. K. SMITH  2,489,938
HOT CATHODE GRID CONTROL GAS TUBE
Filed Sept. 24, 1948  2 Sheets-Sheet 2

INVENTOR.
BY E. K. Smith,
Neil A. Preston,
his ATTORNEY

Patented Nov. 29, 1949

2,489,938

UNITED STATES PATENT OFFICE 2,489,938

HOT CATHODE GRID CONTROL GAS TUBE

Earl K. Smith, West Orange, N. J., assignor to Electrons, Incorporated, Newark, N. J., a corporation of Delaware Application September 24, 1948, Serial No. 51,040

20 Claims. (Cl. 250—27.5)

This invention relates to electron discharge tubes, and more particularly to grid control gas filled tubes of the hot cathode type.

In certain uses and applications of hot cathode grid control gas filled tubes, the positive gas ions formed during conduction of the arc discharge by the tube should be quickly dissipated when this discharge ceases, so as to reduce ionic bombardment of the anode and tendency to reduce the pressure of the gas filling by an action commonly called gas clean up, and also to shorten the time for effective deionization and the grid to regain its control. Generally speaking, in gas discharge tubes of the type contemplated, the process of deionization involves principally the diffusion of the positive gas ions of the plasma to the surfaces of the tube walls, electrodes or other solid bodies, where deionization by surface recombination may occur. This deionization process is favored by reducing the distance the positive ions have to travel in their random motion to reach such recombination surfaces. Also, the volume of ionized gas in a given inter-electrode space is a factor influencing the deionization of gas ions in such space. The space relationship of the electrodes and tube elements in a grid control gas filled tube, however, are significant factors in obtaining various desirable operating characteristics for the tube, such as a suitable grid control ratio or relation of anode and grid voltages for effective control of conduction, inverse and starting voltage ratings, and the like, so that a number of interrelated and somewhat conflicting factors are involved in the design of a tube structure, which has a short deionization time and tolerable tendency for gas clean up or commutation factor, as well as other operating characteristics for a satisfactory tube.

With these and other considerations in mind, it is proposed in accordance with this invention to provide a tube structure having a space relationship of electrodes, together with special recombination surfaces in the grid to cathode region, in such a way that the effective deionization time of the tube and tendency for gas clean up may be reduced to a high degree, without materially affecting other desirable operating characteristics for the tube, such as grid control ratio, starting voltage, and the like.

Generally speaking, without attempting to define the nature or scope of the invention, it is proposed to employ a relatively close grid to anode spacing, and to provide in the region between the grid and heat shielded cathode an auxiliary deionizing element having recombination surfaces of appropriate dimensions and space relationship to the main path of the discharge, together with the appropriate anode and grid structures for heat dissipation and the like to minimize the deleterious effects of electron emission from these electrodes.

More specifically, in addition to a relatively close anode to grid spacing and heat dissipating facilities, deionization is facilitated in the tube of this invention by an auxiliary deionizing element in the form of a sleeve or cap around the discharge opening in the heat shield for a cathode, said element affording substantial recombination surfaces at the appropriate potential located close to the main path of the discharge current and region of high ion concentration or density between the heat shielded cathode and grid.

Various other objects, characteristic features and attributes of the invention will be in part apparent, and in part discussed as the description progresses.

Although the tube of this invention may take various structural forms, it is convenient in describing the principles and mode of operation characteristic of the invention to refer to the typical tube structures illustrated in the accompanying drawings. In these drawings.

The typical tube structure illustrated comprises in general a hot cathode C of the oxide coated type, enclosed in heat shield HS, a control grid G with spaced grid bars, an auxiliary deionizing element DE between the grid G and heat shield HS, and a circular planar anode A, together with suitable rods and supports for mounting and supporting these tube elements in the proper insulated space relation within a glass evacuated envelope E, having cemented thereto the usual pin base B.

Figure 1:
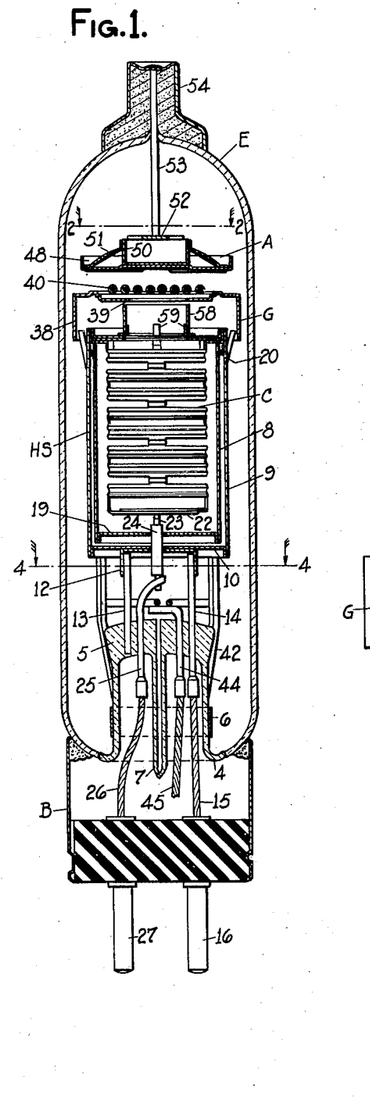
Fig. 1 is a longitudinal section through a tube embodying the invention in one form and illustrating the general combination and arragement of parts representative of the invention.
Figure 2:
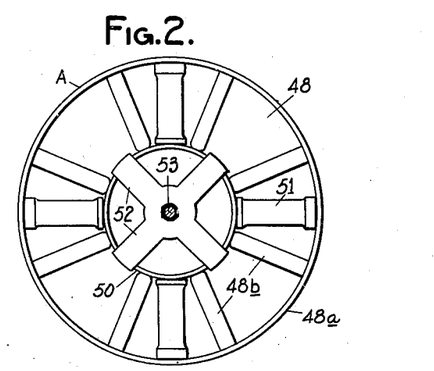
Fig. 2 is an enlarged top view of the anode, corresponding to a section on the line 2—2 of Fig. 1.

In the specific tube structure shown in Fig. 1, a circular mounting stem 4, with a flattened press 5 at its top, is fused to the lower end of the glass envelope E. The various supports and lead-in conductors for the cathode C and grid G are anchored and sealed in this press 5. A metallic band or collar 6 crimped tightly on the mounting stem 4 (see Fig. 4) is employed to provide the base supporting element for the grid G, as later explained. The mounting stem 4 has the usual tubulation 7 for use in exhausting the envelope E.

Figure 4:
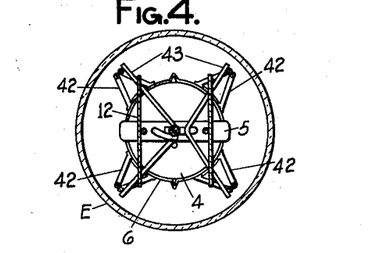
Fig. 4 is a transverse section through the lower part of the tube on the line 4—4 in Fig. 1 to show the relationship of the supporting elements in the particular structure shown.

The heat shield HS for the cathode C comprises inner and outer cylindrical cans 8 and 9 of sheet metal, preferably nickel. A flanged bottom 10 is welded to the cylindrical side wall of the outer heat shield can 9; and a bracket 12 of inverted U-shape is welded to the underside of this bottom 10. A pair of rods 13, 14, welded at their upper ends to the legs of this bracket 12, are anchored in the press 5 of the mounting stem, one of these rods 14 extending through a seal in this press to provide a lead-in connection to the heat shield. This rod 14 has the usual connection 15 to a pin 16 in the base B.

The inner heat shield can 8 has a flanged bottom 19 welded to the lower edge of its cylindrical side wall. The upper edge of this side wall is slotted at a number of points to provide a plurality of tabs, such as the tab 20 shown in Fig. 3; and these tabs are bent out and welded to the cylindrical side wall of the outer can 9 to support the inner can 8.

The cathode C is of the cylindrical slotted type, such as disclosed in the prior patent to D. V. Edwards et al. No. 2,111,506, March 15, 1938. In general, this type of cathode comprises a thin sheet of nickel formed with staggered slots, which is rolled and welded into a cylinder, with the slots extending transversely thereof, so that the strips between the slots constituting the core metal for the cathode are heated to the appropriate emitting temperature by current flowing lengthwise of the cathode cylinder over zig-zag paths provided by the staggered slots. This slotted cylinder is corrugated for stiffness, and its inside surface is coated with a suitable emissive coating of the barium oxide type, preferably formed and treated in the manner disclosed in the prior patent to D. V. Edwards et al., No. 2,081,864, May 25, 1937.

The slotted cylinder for the cathode C is provided at its lower edge with a pair of bent strips or tabs 22, which are welded to the bent upper end of a supporting rod 23. The cathode supporting rod 23 extends through a tube or sleeve 24 of steatite or like heat resistant insulating material fitting tightly in central holes in the bottoms 19 and 10 of the inner and outer heat shield cans 8 and 9. The lower end of this cathode supporting rod 23 is welded to the upper end of a rod 25 sealed in the press 5 and constituting a supporting and lead-in connection for the lower end of the cathode C. This rod 25 is connected in the usual way by a conductor 26 to another pin 27 in the base B.

Figure 3:
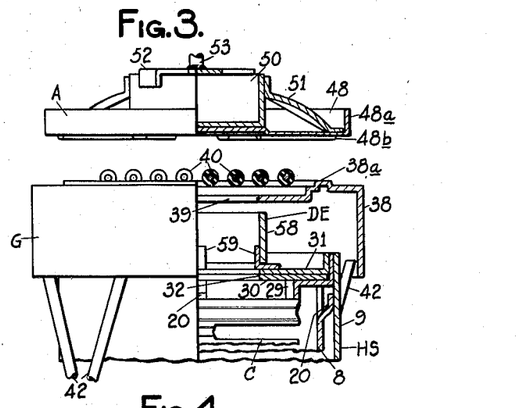
Fig. 3 is an enlarged view, with parts in section and parts broken away, of the anode, grid and upper portion of the heat shielded cathode.

The upper end of the cathode C is connected to the upper end of the heat shield HS, which is closed by a double wall top having therein the usual central discharge opening. In the particular structure illustrated, as best shown in Fig. 3, a plurality of tabs for the upper edge of the cylindrical cathode C, such as the tab 29 shown in Fig. 3, are bent to form supporting shoulders for a circular disc 30; and the ends of these tabs extend between a peripheral flange on the top 31 for the heat shield HS and the cylindrical side wall of the outer heat shield can, these overlapping parts being welded together. The top 31 and the disc 30 under it both have a central discharge opening of circular cross section indicated at 32.

It can be readily seen that cathode heating current from a suitable source, such as a heating transformer, connected to the base pins 27 and 16 and the lead-in conductors 26 and 15 for the lower end of the cathode C and the heat shield HS respectively, may flow lengthwise through the cathode to raise it to the proper emitting temperature, the heat shield HS forming a part of this heating circuit within the tube.

The grid G in the tube structure illustrated is of the grid bar type, and comprises in general an inverted circular cup 38 of nickel or Nichrome steel, having a central discharge opening 39 surrounded by a raised portion or flange 38a to which the ends of the grid bars 40 are welded. These grid bars 40 are preferably tungsten rods having a layer or coating of tungsten oxide in accordance with the disclosure of the prior patent to D. V. Edwards et al., No. 2,012,339, August 27, 1935, so as to reduce the tendency for the grid to become emissive. These grid bars are appropriately spaced in accordance with the teachings of the prior patent to D. V. Edwards et al., No. 2,068,539, January 19, 1937, so as to provide the desired grid control ratio for the electrode spacing, rating and type of tube.

It should be noted that the inverted cup 38 forming the body for the grid G provides a deep flange or skirt, which extends below the upper edge of the heat shield HS, so as to shield the area of critical control between the cathode and grid and enable the grid to perform the desired controlling functions. This peripheral flange or skirt on the grid G also affords a substantial surface for radiation of heat from the grid to the walls of the tube envelope E, which are spaced relatively close to the grid, as shown in Fig. 1. This heat radiating surface of the grid is preferably coated or treated to improve its heat radiating ability. One expedient is to carbonize this grid surface in accordance with recognized practice. Also, this grid surface may be pimpled or roughened in some suitable manner, such as by sand blasting, to improve its coefficient of heat radiation.

The grid G is supported by the crimped collar 6 on the mounting stem 4 by a plurality of hairpin supports 42, four as shown. The lower U-shaped ends of these supports 42 are welded at intervals to the collar 6 (see Fig. 4); and the upper ends of these supports are spread apart and welded at intervals to the skirt of the grid (see Fig. 3). The intermediate portions of these hairpin supports 42 are preferably welded together. Two bent cross bars 43, arranged generally in the form of a cross, as best shown in Fig. 4, have their outer ends welded to the hairpin supports 42; and the bent upper end of a rod 44 sealed in the press 5 is welded to the intermediate portions of these cross bars 43. The rod 44, connected in the usual way by a conductor 45 to a pin (not shown) in the base B, constitutes a lead-in connection for the grid circuit.

The anode A comprises a disc 48, preferably of tantalum, having an up-turned peripheral flange 48a and a plurality of radial corrugations or ribs 48b extending from a central flat portion. This flange 48a and the radial ribs 48b give the desired stiffness to the thin sheet of tantalum to prevent its bending or warping under temperature variations, more particularly when it is heated to the high temperature needed for adequate degassing.

In accordance with this invention, the anode A has a relatively close spacing to the grid G, for reasons hereinafter explained; and it is desirable to avoid localized overheating of the tantalum disc 48 and provide auxiliary heat dissipation facilities in accordance with the disclosure of the prior Patent No. 2,456,540, December 14, 1948. In the specific anode structure shown herein, a cylindrical cup 50 of iron or an iron alloy has its bottom spot welded at a large number of closely spaced points to the central flat portion of the tantalum disc 48, and a plurality of braces 51, also preferably of iron, having their bent ends welded to the upper edge of this cup and to the disc 48 of the anode A. A cruciform supporting member 52, having its downturned ends welded to the rim of the cup 50, is welded to the lower end of the rod 53, which extends through a seal in the upper end of the envelope E to afford a support and electrical conductor for the anode A. This anode supporting rod 53 may be provided with the usual cap 54. The heat conducting and radiating facilities afforded by this anode structure cause the anode to assume a lower temperature in operation for a given conduction current, and thus enables the anode to be spaced closer to the grid without objectionable overheating of the grid.

Another important feature of the tube structure of this invention is the provision of an auxiliary deionizing element in the region between the grid and the heat shielded cathode to facilitate deionization of the residual gas ions in this region upon cessation of discharge through the tube. In the typical tube structure illustrated in Fig. 1, this deionizing element DE is in the form of a metallic hollow cylinder or sleeve 58 of nickel or like metal disposed lengthwise between the top of the heat shield HS and the grid G. This sleeve 58 is preferably of a cross section comparable with that of the discharge opening 32 in the heat shield HS and the opening 39 in the grid G, so as to provide a circumferential surface around and close to the main path of the discharge current through the tube. Also, this sleeve 58 preferably extends from the heat shield HS close to the underside of the grid G, so as to extend for the greater part of the length of the main discharge path between the heat shielded cathode and the grid G. Such dimensional and space characteristics of the deionizing sleeve 58 illustrated are typical or representative of an auxiliary deionizing element DE considered preferable in practicing this invention as later discussed.

In the tube structure illustrated in Fig. 1, which is suitable for tubes of certain ratings and operating characteristics, the deionizing sleeve 58 is attached to and supported by the heat shield HS, and operates at a corresponding potential. In the specific structure shown, the sleeve 58 is secured to the flanged top 31 of the heat shield HS by a plurality of thin L-shaped brackets 59 welded to this top and to the sleeve 58 respectively, as best shown in Fig. 3.

A deionizing sleeve 58 as shown in Fig. 1, when attached to the heat shield HS, tends to increase the starting voltage required for the tube, i. e. the positive anode voltage needed to render the tube conductive with the control grid G at zero potential, since the electric field of the positive anode voltage is rendered less effective by this sleeve 58 at cathode potential to draw electrons from the cathode and cause ionization of the gas filling of the tube. In the tube structure illustrated in Fig. 5, which is preferably where it is desired to have a tube embodying this invention with a low starting voltage, the deionizing element DE is mounted as a separate auxiliary electrode, which may be connected to the anode A through a suitable resistor R, for the purpose later discussed. In the specific structure shown in Figs. 5 and 6, the sleeve 62 corresponding with the sleeve 58 in Fig. 1, is supported by a pair of cross-members 63 welded thereto (see Fig. 6) and to the upper ends of two rods 64, which are supported from the outer heat shield can 9 by insulator structures in accordance with the disclosure of the prior Patent No. 2,456,540, December 14, 1948. In this type of insulated supporting structure, which is claimed in my prior patent, each rod 64 extends through a tubular insulator 65 of steatite or like heat resistant insulating material, which has a recess at each end and is attached to the outer heat shield can 9 by wires or bands 66 wrapped around these tubes in grooves and welded to said can. The rods 64 are connected at their lower ends by a cross-member 67, which is supported by a rod 68 sealed in the mounting stem 69 of the tube envelope and extending to the outside to constitute an external connection for the deionizing sleeve 62. While the sleeve 62 is shown supported by two rods 64, three such rods 64 equally spaced may be used if a more rigid support is desired.

In the preferred arrangement shown, the deionizing sleeve 62 acting as an auxiliary electrode is connected to the anode A through a resistor R of the appropriate value as later discussed. If desired, this resistor R may be housed in the base of the tube.

Figure 5:
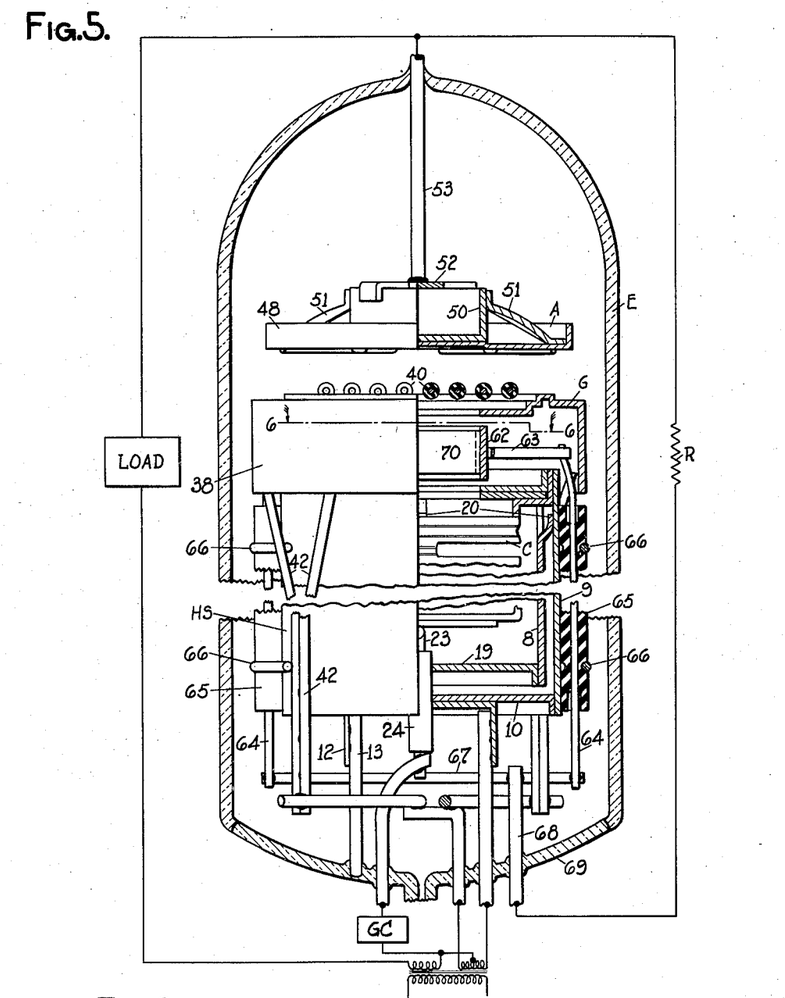
Fig. 5 is a longitudinal section, partly broken away, of a tube embodying a modified form of the invention.
Figure 6:
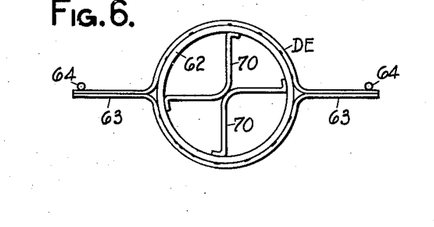
Fig. 6 is a top view of the deionizing element of Fig. 5, corresponding to a section on the line 6—6 in Fig. 5.

When the deionizing element DE is a separate electrode as shown in Fig. 5, it may be constructed to afford larger deionizing surfaces in the main path of the discharge, without materially increasing the starting voltage. In the typical arrangement illustrated, such increase in the deionizing surface is obtained by providing radial partitions 70 within the sleeve 62, as best shown in Fig. 6. These partitions 70 may be formed by flat strips having their bent ends welded to the inner surface of the sleeve 62. Various other structural forms for the deionizing element DE may be employed.

After the tube elements above described have been mounted and assembled in the envelope E, the tube is subjected to a rigid schedule of degassing and exhaust, using the exhaust tubulation 7 in the usual way. This schedule involves heating all of the electrodes, supports and the tube envelope to the appropriate temperature for thorough degassing by induction heating, baking, and electron and ionic bombardment by conduction through the tube, so that all parts of the tube are freed of the occluded gases to a high degree. In this connection, the anode cup 50, grid G, auxiliary deionizing sleeve 58 and like parts are preferably made of a thin sheet metal stock to facilitate heating and degassing of these parts, which tend to assume high temperatures in the normal operation of the tube. During the degassing and exhaust procedure, the cathode is activated in accordance with recognized practice; and the envelope is filled with an ionizable medium at the appropriate pressure, preferably with one or more of the inert gases, such as xenon, krypton or argon.

In explaining the principles and mode of operation of this invention, as exemplified in the typical tube structures shown and described, it is expedient to discuss theories of operation of gas filled tubes of the type contemplated; but it should be understood that this theoretical discussion is necessarily general and incomplete, and that the operation and utility of the invention does not depend upon the accuracy or sufficiency of my theoretical explanation of its principles and mode of operation.

As previously indicated, the primary objects of this invention are to shorten the effective deionization time for the grid to regain its control in tubes of the type contemplated, and also to reduce the tendency for gas clean-up in such tubes. While these problems and their solution are rather closely related, it is convenient to discuss separately the operating conditions and structural features of the tube of this invention for shortening the deionization time, and for reducing the tendency for gas clean-up.

Considering first the matter of deionization time for the grid to regain its control, when a gas tube is conductive, the arc drop in the tube is largely across the ion sheath at the cathode, and the rest of the discharge path includes a plasma of substantially equal instantaneous concentration of electrons in motion toward the anode and positive gas ions. If under such conditions a negative potential is applied to the grid, a sheath of positive ions is formed at the grid surfaces to neutralize the effect of its negative potential upon the electrostatic field in the plasma, so that the tube continues to conduct as long as its anode voltage remains sufficiently positive. When the positive anode voltage is discontinued, such as at the end of a positive half-cycle of alternating anode voltage, as is often the case, the electrons are no longer drawn from the cathode to keep the plasma ionized, conduction through the tube ceases, and the natural processes for deionization of the residual gas ions may start. After this deionization has progressed to a certain degree after a time dependent upon the type of tube, electrode voltages and other complicated factors, the ion sheath at the grid is no longer effective to neutralize its negative potential, and the grid may regain its control over firing of the tube as and when the anode voltage again becomes positive.

A short effective deionization time for the grid to regain its control is desirable for various applications and uses of gas tubes. For example, when a gas tube is operated in a controlled rectifier, inverter or the like with an alternating anode voltage of a relatively high frequency, such as 2000 or more cycles per second, the positive half-cycles tending to fire the tube occur in quick succession; and unless the tube becomes sufficiently deionized between these successive positive half-cycles of anode voltage for the grid to regain control, the grid is no longer capable of controlling conduction through the tube, and once fired it continues to conduct until the source of anode voltage is disconnected. Also, inductance associated with the anode circuit of a tube as part of a load or as inherent reactance of a transformer tends to shorten the time available for deionization by prolonging conduction through the tube after the positive half-cycle of anode voltage has ceased.

Considering the theoretical factors affecting the deionization time for the grid to regain its control, when the anode to cathode voltage falls below the level needed to maintain ionization of the plasma and conduction through the tube ceases, the electrons in the plasma on account of their mobility are quickly swept out of the plasma leaving a concentration of residual gas ions having a relatively slow random motion or drift. When cessation of conduction through the tube is followed by an inverse or negative voltage on the anode, as is often the case, the residual gas ions, subject to the effect of space charge, may be drawn to the anode. The residual gas ions above and adjacent the grid, particularly if a relatively close anode to grid spacing is employed as later discussed, are apparently drawn quickly to the anode; but the ion sheath at the grid cannot be dissipated sufficiently for the grid to regain its control so long as other residual gas ions may move to the grid and replace those being drawn away. In the type of tube contemplated, a substantial spacing and volume between the grid and heat shielded cathode is desirable to obtain the appropriate grid control ratio, avoid overheating of the grid by heat radiated from the cathode, and obtain other desirable characteristics, so that there is a substantial volume of residual gas ion concentration in the region between the grid and the heat shielded cathode. My investigations indicate that the life of the residual gas ions in this grid to cathode region materially influence the deionization time required for the grid to regain its control.

As previously suggested, the deionization of residual gas ions in a gas tube when conduction ceases is due mainly to the movement of such ions to some surface, such as a tube wall, electrode or other body, where deionization by surface recombination may occur. In accordance with this invention, it is proposed to provide an auxiliary deionizing element DE, specifically in the form of a tube or sleeve 58, in the region between the grid G and the heat shielded cathode, so as to facilitate and hasten the deionization of the residual gas ions in this region. It is found that such a deionizing sleeve 58 in this region materially reduces the effective deionization time for the grid to regain its control. This is attributed to the fact that the sleeve 58 affords surfaces close to the concentration of the residual gas ions, so that these ions have only a short distance to move on the average in their drift or random motion to reach a surface of this sleeve, where deionization by surface recombination may occur. In accordance with this theory of operation, it is desirable that the deionizing element DE should afford surfaces close to the concentration of ions remaining from the previous discharge, so that the greatest number of ions are only a short distance from an auxiliary deionizing surface. On the other hand, it is desirable that this deionizing element DE should not have extensive surfaces extending transversely of the main path for movement of electrons from the cathode to the anode, because this would adversely affect the starting voltage and arc drop voltage for the tube. For these reasons, it is preferable to employ a deionizing element DE in the form of a cylinder or sleeve of a diameter comparable with that of the main path of electron current from the cathode through the discharge openings in the heat shield HS and grid G, which will afford surfaces of substantial area along and close to the main path of the discharge current and concentration of residual gas ions, and surfaces of limited area transversely of this path to affect adversely the starting voltage and arc drop of the tube. It is also preferable to extend such a sleeve 58 from the heat shield HS to a point close to the underside of the grid G, so that the sleeve extends along the greater part of the main path of the discharge current between the heat shielded cathode and the grid, and embraces more fully the area of residual ion concentration. Such shape and dimensions of the deionizing element DE, however, are merely typical or illustrative, and this deionizing element DE may take any suitable form in accordance with this invention, so long as it affords deionizing surfaces adjacent the region of residual ion concentration between the grid and heat shielded cathode to facilitate deionization of these ions to the appropriate degree for the type of tube and its desired operating characteristics.

In the tube structure shown in Figs. 1 and 3, the deionizing sleeve 58 is attached to the upper end of the heat shield HS, and accordingly is at the potential of one end of the cathode C. With such an arrangement there is a limitation upon the dimensions of the sleeve 58 that may be used without increasing to an objectionable degree the starting voltage of the tube, i. e. the anode voltage required to initiate a discharge through the tube with its grid at zero potential. This is because the sleeve 58 interposes surfaces at cathode potential between the anode and the emissive surface of the cathode, so that a higher anode voltage is needed to accelerate electrons emitted from the cathode to a velocity to ionize the gas filling and initiate cumulative ionization and conduction through the tube. Thus, while an increase in the dimensions of the deionizing sleeve 58 facilitates deionization and decreases the deionization time for the grid to regain its control, such increase in the dimensions of the sleeve 58 at the same time tends to increase the starting voltage required for the tube. The relative importance of a short deionization time and a low starting voltage for a given tube depends upon the use or application of the tube, as well as other features of tube structure relating to grid control ratio and the like, so that a deionizing sleeve 58 of the appropriate dimensions attached to the heat shield HS as shown in Figs. 1 and 3 may be employed to advantage in many situations.

In the modified form of the tube structure embodying this invention and illustrated in Fig. 5, the deionizing element DE, in the form of a sleeve 62 with partitions 70 as shown in Fig. 6, is supported and insulated from the heat shield HS as a separate electrode, and is connected to the anode A through a resistor R. In this arrangement, the dimensions and space relationship of parts, including the resistance value of the resistor R, may be chosen to shorten the deionization time for the grid to regain control to the extent desired, and also retain a low starting voltage and a suitable high grid control ratio. This modified arrangement of Figs. 5 and 6 is adaptable for the applications and uses of tubes of the type contemplated, where a relatively low starting voltage is desirable along with a short time of deionization for the grid to regain control.

These operating characteristics of the modified tube structure of Figs. 5 and 6 are attributed to the fact that, when the anode assumes a positive potential with respect to the cathode, the auxiliary deionizing sleeve 62 tends to assume a like positive potential and draw to it electrons from the cathode and cause a partial ionization of the gas filling of the tube, thereby facilitating firing of the tube for a zero grid potential. In this connection, electron current to the sleeve 62 for a positive potential is accompanied by a voltage drop in the resistor R tending to reduce this positive potential. The sleeve 62 automatically tends to assume the positive potential to give the electron current needed for the voltage drop through the resistor R being used, much the same as the conventional grid leak and capacitor gives an automatic negative biasing voltage for the grid in the ordinary high vacuum tube. By selection of the appropriate resistance value for the resistor R, electron current drawn by the deionizing sleeve 62 may cause a partial ionization or glow discharge, which does not constitute an arc discharge caused by a cumulative ionization characteristic of the actual firing of a gas tube, and which does not permit the formation of an ion sheath at the grid and prevent it from performing its normal function of controlling conduction through the tube. Under such conditions, a negative potential on the grid is effective to prevent firing of the tube, but when the grid assumes a zero potential, the electrostatic field of the anode voltage, in cooperation with the electric field provided by the existing potential of the sleeve 62 and the partial ionization, is effective to cause the cumulative ionization and arc discharge through the tube in the usual way. Since the electrostatic field of the anode voltage is assisted, so to speak, by that of the sleeve 62, a relatively low anode voltage is effective to fire the tube for a zero grid potential. In other words, the tube under such conditions will have a low starting voltage.

While the tube is conducting, the potential gradient through the plasma is small, there is little difference of potential between the anode and the auxiliary deionizing sleeve 62, and the potential of this sleeve is essentially that of the plasma. When conduction ceases and the anode assumes a negative potential, the sleeve 62 would likewise tend to assume a like negative potential due to its electrical connection to the anode; but theoretical considerations suggest that this negative potential is at once reduced by the accumulation of positive ions with the resistor R limiting the rate of electron movement to this sleeve, and also that an ion sheath is at once formed at this sleeve to neutralize the effect of its negative potential upon the random movement of other residual gas ions in the plasma. At least, my investigations to date indicate that the time for effective deionization is about the same for auxiliary deionizing sleeves of comparable dimensions and surface area, whether connected to the heat shield as in Fig. 1, or to the anode through a resistor R as in Fig. 5, suggesting that there is no substantial acceleration of positive gas ions by a sustaining negative potential on such a deionizing sleeve. It is believed that in either case, when the discharge ceases, the auxiliary deionizing sleeve operates at a potential corresponding with that of the plasma, and facilitates the deionization in its region by producing short paths for the movement of the residual gas ions in their random motion to reach a surface where deionization by surface recombination may occur. A deionizing sleeve such as 62 in Fig. 5 connected to the anode through an appropriate resistor R, however, does materially reduce the starting voltage for the tube, without substantially affecting the deionization time.

The appropriate resistance value for the resistor R in Fig. 5 to be chosen depends upon the desirability of certain tube characteristics. Among other things, the value of this resistance affects the ionic current to the grid existing just before the tube fires; and this grid current is a significant factor and should not be excessive in many applications of grid control tubes on account of the resistance employed in the grid circuit. This resistance also affects the grid control ratio for the tube along with its starting voltage. For example, a low resistance which will cause a substantial electron current and a partial ionization or glow discharge to a high degree, will help to decrease the starting voltage, but will also decrease the grid control ratio, i. e. the ratio of the anode voltage to the negative grid voltage for firing of the tube. These and other factors have to be taken into consideration in selecting the optimum resistance value of the resistor R for a given tube structure in accordance with this invention. As indicative of the resistance value of the resistor R for ordinary circumstances, I find that a resistance in the order of 100,000 ohms is suitable for the usual application of tubes of the type shown.

Considering now the matter of gas clean-up, which adversely affects the useful life of tubes of the type contemplated under certain operating conditions, my investigations indicate that this gas clean-up is due to the application of a relatively high inverse or negative voltage to the anode immediately after conduction through the tube has ceased. It is believed that such inverse voltage causes excessive ionic bombardment of the anode, which acts in some manner not fully understood to absorb or trap molecules of the gas filling at the surface of the anode, and in material sputtered from the anode and deposited on other surfaces, such as the walls of the tube envelope. In several applications and uses of grid control gas filled tubes, a relatively high inverse voltage is applied to the anode immediately after conduction of substantial current through the tube has ceased; and under such operating conditions the resultant ionic bombardment of the anode and the tendency for gas clean-up objectionably shortens the useful life of the tube. This tendency for gas clean-up may be overcome by using suitable cushioning means to control the rate of rise of the inverse voltage across the tube, as disclosed in the prior patent to D. V. Edwards, No. 2,443,100, June 8, 1948. The present invention is intended to provide a tube structure which by itself will overcome the tendency for gas clean-up under the operating conditions where relatively high inverse voltage is applied across the tube immediately after conduction ceases.

My investigations indicate that the tendency for gas clean-up is not sufficient to affect tube life objectionably, if the ionic bombardment of the anode can be kept within tolerable limits. For a given inverse voltage across the tube and a given density of residual gas ions, the ionic bombardment of the anode depends upon the number of gas ions drawn to the anode and the average distance through which these ions are accelerated to attain their bombarding velocity. In the tube structure of this invention, as previously explained, the anode A is spaced as close as practicable to the grid G. It is found that this close anode to grid spacing materially reduces the tendency for gas clean-up. This is attributed to the fact that such close anode to grid spacing decreases the volume of concentration of the residual ions likely to be drawn to the anode from this region, and also the average distance through which these ions may be accelerated by a given inverse voltage, and the bombarding velocity they may attain.

Also, in the tube structure of this invention, in addition to this close anode to grid spacing, an auxiliary deionizing element DE is provided in the region between the grid and the heat shielded cathode; and this deionizing element serves, as previously explained, to facilitate and hasten deionization of the residual gas ions in this region. This also helps to reduce the tendency for gas clean-up, because the deionizing element DE acts to reduce the ion concentration and the number of ions that might otherwise be drawn past the grid to the anode and attain such a final velocity due to the distance of their movement as to contribute substantially to the ionic bombardment of the anode.

In accordance with this invention, the anode is preferably spaced as close to the grid as practicable within the limitations imposed by the tube characteristics, operating temperature, accuracy in the space relationship of parts obtainable with ordinary mounting procedure, and the displacement or warping of the anode or grid or their supports when heated to the temperature needed for adequate degassing. One important factor in this connection is the temperature which the grid assumes in operation. If the grid is overheated, it becomes objectionably emissive and interferes with the desired operation of the tube. When the anode is brought close to the grid, radiation of heat from the anode tends to overheat the grid. In the tube structure of this invention, special heat radiating facilities are provided for the anode to keep its temperature relatively low during its operation, and permit the grid to be more closely spaced to this anode without becoming objectionably overheated. These heat dissipation facilities are provided in accordance with the disclosure of the prior Patent No. 2,456,540, December 14, 1948, and include the cup 50 of iron welded to the disc 48 of the anode, which together with the braces 51 affords auxiliary heat radiation surfaces to reduce the normal operating temperature of the anode.

Also, in order to facilitate heat radiation from the grid G, its skirt 38 preferably has its surface treated for efficient radiation of heat, as previously explained, so as to radiate more effectively the heat received from a closely spaced anode. With these structural expedients for heat dissipation, I find that it is feasible to employ a close anode to grid spacing in the order of one millimeter or less; and such close spacing, which may be obtained with ordinary mounting procedures, greatly reduces the tendency for gas clean-up, without materially affecting the desirable operating characteristics of the tube.

Various adaptations, modifications and additions may be made in the specific tube structure shown and described without departing from the invention as exemplified in this typical embodiment. For example, the same auxiliary deionizing element and concepts of electrode spacing and heat dissipation above discussed in connection with a tube having an inert gas filling, may be utilized to advantage for tubes using as the ionizable medium mercury vapor alone, or in combination with argon or some other gas. Similarly, the form and space relationship of the electrodes, their mounting and supports, and various other structural features of the typical tube shown may be materially modified without departing from the invention.

What I claim is:

1. A grid control gaseous discharge tube comprising in combination, a heated thermionic emissive cathode, a heat shield surrounding said cathode except for a discharge opening, an anode having an electron receiving surface opposite said discharge opening, a control grid between said discharge opening in the heat shield and said anode for controlling initiation of a gaseous discharge between the cathode and anode, and an auxiliary deionizing element between said grid and heat shield having an opening comparable in dimensions with the discharge opening in the heat shield and affording surfaces of substantial area along the main path of discharge current, whereby deionization of the residual gas ions in the region between the grid and the heat shielded cathode is greatly facilitated upon cessation of conduction through the tube without materially interfering with electron movement from the cathode toward the anode and the starting voltage for the tube.

2. A grid control gaseous discharge tube of the character described comprising in combination, a hot cathode, anode and control grid in an envelope containing an ionizable medium, a heat shield around said cathode except for a discharge opening opposite said control grid and anode, said control grid being separated from the heat shielded cathode to leave a region of substantial volume for concentration of residual gas ions upon cessation of conduction through the tube, and an auxiliary deionizing element in said region between the grid and the heat shield affording surfaces of substantial area along the main path of the discharge between the cathode and grid and surfaces of limited area transversely of said main path of discharge, whereby said deionizing element greatly facilitates deionization of the residual gas ions in the region between the grid and the heat shielded cathode without materially interfering with electron movement from the cathode toward the grid and anode.

3. A grid control gaseous discharge tube comprising in combination, a heated thermionic emissive cathode, a heat shield surrounding said cathode except for a discharge opening, an anode having an electron receiving surface opposing said discharge opening, a grid between said anode and heat shield for governing initiation of conduction through the tube, and a metallic sleeve between said heat shield and grid and having a cross section comparable with the cross section of the main path of the discharge current, said sleeve affording an auxiliary deionizing surface close to the main path of the discharge current to facilitate deionization in the region between the heat shield and the grid, and thereby shorten the time for the grid to regain control after conduction through the tube has ceased.

4. A grid control gas filled tube of the type described comprising in combination, a heat shielded hot cathode having a discharge opening to afford a principal path for the discharge current, an anode having an electron collecting surface extending transversely of said principal path of discharge current, a control grid closely spaced to the surface of said anode and at a substantial distance from the grid to provide a high grid control ratio, said anode and grid having heat radiating surfaces to keep the operating temperature of said grid within tolerable limits in spite of its relatively close spacing to said anode, and a metallic element in the region between said heat shield of the cathode and grid and having a substantial surface along the principal path of the discharge current for facilitating deionization in this region by surface recombination.

5. An electron discharge tube of the type described comprising in combination, a hot cathode, a heat shield around said cathode having a discharge opening, a planar anode opposite said discharge opening in the heat shield and having auxiliary heat radiating surfaces, a control grid between said cathode and anode spaced relatively close to the surface of said anode and at a distance from the discharge opening in the heat shield conforming with a high grid control ratio, said control grid having a peripheral skirt with an extensive heat radiating surface to reduce its temperature and emissivity during operation of the tube in spite of its relatively close spacing to the anode, and an auxiliary deionizing element in the region between said heat shield and said grid and affording a recombination surface of substantial area along the main path of the discharge from the heat shielded cathode to the grid, whereby the effective time of deionization for the grid to regain its control and ionic bombardment of the anode upon cessation of conduction through the tube are materially reduced.

6. A grid control gaseous discharge tube comprising in combination, a heat shielded hot cathode having a discharge opening, a planar anode opposite said discharge opening and having auxiliary heat radiating surfaces, a flat grid between said anode and heat shielded cathode spaced relatively close to the surface of said anode, said grid having a peripheral skirt with its surface treated for efficient heat radiation enclosing the region between said cathode and grid, said grid skirt permitting heat radiation from the grid to keep its temperature within tolerable limits in spite of its proximity to the anode, and an auxiliary deionizing element providing deionizing surfaces of substantial area in said region enclosed by said grid skirt for facilitating the deionization of the residual gas ions in this region upon cessation of the discharge current through the tube.

7. A grid control gaseous discharge tube comprising in combination, a hot cathode, a heat shield with a discharge opening therein surrounding said cathode, an anode opposite said discharge opening, a flat grid between said anode and heat shielded cathode, and a metallic auxiliary deionizing element attached to said heat shield around said discharge opening, said element affording a surface of substantial area adjacent the main path of discharge current for facilitating deionization of the ions in the region between the grid and cathode, whereby the deionization time for the grid to regain control after conduction through the tube has ceased is materially reduced.

8. A gas filled tube of the character described comprising in combination, an anode, a hot thermionic emissive cathode, a cylindrical heat shield around said cathode having a circular discharge opening in one end, a metallic cylindrical sleeve supported by said heat shield around its discharge opening and having a diameter comparable with the diameter of said discharge opening, and a flat grid closely spaced to the outer end of said sleeve for controlling initiation of an arc discharge from said cathode to said anode, said sleeve affording a surface of substantial area closely spaced to the main path of the discharge current for facilitating by surface recombination the deionization of the gas ions in the region between the heat shield and grid upon cessation of conduction through the tube.

9. A grid control gas filled tube of the type described comprising in combination, a heated thermionic emissive cathode, a heat shield surrounding said cathode except for a discharge opening, a planar anode opposite said discharge opening, a flat control grid between said anode and heat shield, said grid being disposed relatively close to the surface of said anode to decrease its ionic bombardment and having heat radiating facilities to avoid overheating of the grid by heat radiated from the anode, and a metallic sleeve attached to said heat shield around its discharge opening and extending close to said grid, said sleeve affording recombination surfaces of substantial area close to the main path of the discharge current from the cathode to the anode to facilitate deionization of the residual gas ions in the region between the cathode and grid when conduction through the tube ceases.

10. A grid control gas filled tube comprising in combination, a hot thermionic emissive cathode, a heat shield around said cathode having a discharge opening in one end, a control grid having a similar discharge opening therein disposed in alignment with the discharge opening in the heat shield for controlling initiation of discharge current through the tube, said grid having spaced grid bars across the discharge opening and a skirt enclosing the space between said grid bars and heat shield, and a metallic auxiliary deionizing element between said grid and said heat shield and providing substantial surfaces around and close to the main path of the discharge current through said discharge openings, whereby deionization in the space enclosed by said grid skirt is facilitated by said auxiliary deionizing element.

11. A grid control gaseous discharge tube having a rare gas filling comprising in combination, a hot cathode, a heat shield around said cathode having a discharge opening, an anode opposite the discharge opening, a control grid closely spaced to said anode and at a distance from the heat shielded cathode to afford a relatively high grid control ratio for governing initiation of discharge through the tube, an auxiliary deionizing element in the region between said grid and heat shielded cathode and supported and insulated as a separate electrode, said deionizing element affording surfaces of substantial area along the main path of the discharge current from the heat shielded cathode to the grid and surfaces of restricted area transversely of said main path of discharge current, and means electrically connecting said deionizing element with said anode through a resistor, said resistor having a resistance value limiting the electron current to said deionizing element when the anode is positive to a level reducing the starting voltage for the grid at zero potential while permitting the grid at a negative potential to control initiation of conduction through the tube.

12. A grid control gaseous discharge tube comprising in combination, a hot cathode, a heat shield with a discharge opening therein surrounding said cathode, an anode having an electron collecting surface opposite the discharge opening in said heat shield, a control grid between said anode and heat shielded cathode for controlling initiation of discharge current between said cathode and anode, said grid having a skirt restricting electron movement from the heat shielded cathode to the anode through openings in said grid, said grid being spaced from the heat shielded cathode to afford the desired grid control ratio for the dimensions of the grid openings, an auxiliary deionizing element between said grid and heat shielded cathode having an opening comparable in dimensions with the discharge opening in the heat shield but affording surfaces of substantial area along the path of the main discharge for facilitating deionization of residual gas ions in the region between the grid and heat shielded cathode, means supporting said deionizing element as a separate insulated electrode, and means including a relatively high resistance for electrically connecting said deionizing element to the anode and thereby reduce the starting voltage of the tube for the same deionization facility afforded by said deionizing element.

13. A grid control gaseous discharge tube having a rare gas filling comprising in combination, a thermionic emissive cathode, a heat shield surrounding said cathode except for a discharge opening therein, a control grid and anode opposite said discharge opening in the heat shield, said control grid being closely spaced to the anode and at a distance from the cathode affording a relatively high grid control ratio, an auxiliary deionizing element between said grid and cathode, said deionizing element affording surfaces of substantial area along the main path of discharge between the cathode and grid and an opening for passage of discharge current comparable in dimensions with the discharge opening in said heat shield, said deionizing element acting to facilitate deionization of the residual gas ions in the region between the grid and heat shielded cathode by surface recombination, means for supporting and electrically insulating said deionizing element from said heat shield, and means including a relatively high resistance for electrically connecting said deionizing element to said anode, whereby the starting voltage for the tube is reduced for the same facility of deionization afforded by said deionizing element.

14. A grid control gaseous discharge tube of the type described comprising in combination, a hot cathode, control grid and anode in an ionizable medium, a heat shield enclosing said cathode except for a discharge opening opposite said grid and anode, said grid being closely spaced to the anode and spaced from the heat shielded cathode at a distance consistent with a relatively high grid control ratio, an auxiliary deionizing element between said grid and heat shielded cathode and insulated therefrom, said deionizing element affording surfaces of substantial area generally parallel with the main path of the discharge current between the cathode and grid to facilitate deionization of the residual gas ions in the region between the grid and the heat shielded cathode without materially obstructing electron current from the cathode, and means including a resistor for electrically connecting said deionizing element to said anode, whereby said deionizing element may have surfaces greatly facilitating deionization without materially affecting the starting voltage for the tube.

15. A grid control gas filled tube of the type described comprising in combination, a heat shielded hot cathode, anode and control grid, said control grid being closely spaced to said anode and at a distance from said heat shielded cathode conforming with a relatively high grid control ratio, an auxiliary deionizing element supported by and insulated from said heat shield for providing surfaces of substantial area in the region between said grid and heat shielded cathode along the main path of the discharge current to facilitate deionization by surface recombination, and an electrical connection between said deionizing element and said anode including a resistor, said resistor having a resistance value to cause partial ionization by electron current to said deionizing sleeve when the anode is positive at a level where a negative grid potential will prevent cumulative ionization for conduction through the tube and a zero grid potential will allow the tube to fire.

16. A grid control gas filled tube of the type described comprising in combination, a heat shielded hot cathode, anode and control grid, and a deionizing element between said grid and heat shielded cathode affording surfaces of substantial area generally parallel with the main path of the discharge current for facilitating deionization of the residual gas ions upon cessation of discharge through the tube, and an electrical connection between said deionizing element and said anode including a relatively high resistance appropriate to permit partial ionization in the region between the grid and heat shielded cathode for reducing the starting voltage and also allow a negative grid potential to prevent cumulative ionization and an arc discharge through the tube.

17. A gas tube of the type described including a heat shielded hot cathode, anode and control grid, and comprising in combination with said grid and heat shielded cathode, a cylindrical metallic sleeve extending longitudinally between said grid and heat shield of the cathode to afford deionizing surfaces of the substantial area along the main path of discharge current between the cathode and grid without materially obstructing electron movement from the cathode toward the anode, whereby the effective deionizing time for the grid to regain control is greatly shortened without materially increasing the starting voltage for the tube.

18. A grid control gaseous discharge tube comprising in combination, a hot cathode, a heat shield around the cathode having a discharge opening, an anode having an electron receiving surface opposite said discharge opening, a control grid between said anode and the heat shielded cathode, a metallic cylindrical sleeve having longitudinal partitions therein disposed between said grid and heat shielded cathode and insulated therefrom, and an electrical connection including a resistor of relatively high resistance between the said sleeve and anode.

19. A grid control gaseous discharge tube comprising in combination, a hot cathode, a heat shield around said cathode having a discharge opening, an anode having an electron receiving surface opposite said discharge opening, a control grid between said anode and heat shield closely spaced to said anode and located at a distance from said heat shield for a high grid control ratio, and an auxiliary metallic deionizing element supported by said heat shield in the region between it and said grid, said deionizing element providing a surface of substantial area along and close to the main path of the discharge for facilitating deionization of the residual gas ions in the grid to heat shield region, the surface of said deionizing element transversely of the main path of the discharge being of limited area to reduce the effect of its presence upon the starting voltage for the tube.

20. A grid control gaseous discharge tube comprising in combination, a hot cathode, an anode, a heat shield around said cathode except for a discharge opening opposite said anode, a control grid between said anode and said heat shield having an opening opposite said discharge opening, and a metallic sleeve attached to said heat shield around its discharge opening and extending longitudinally toward said grid for the greater part of the distance between said heat shield and grid, said sleeve affording a surface of substantial area around and close to the main path of the discharge for facilitating deionization of the residual gas ions in the region between the heat shield and grid, said sleeve having a surface of limited area exposed to the electrostatic field of the anode, whereby said sleeve acts to shorten to a substantial degree the effective deionization time for the grid to regain control without materially increasing the starting voltage for the tube.

EARL K. SMITH.

REFERENCES CITED

The following references are of record in the file of this patent:

UNITED STATES PATENTS

| Number | Name | Date |
| --- | --- | --- |
| 2,111,506 | Edwards | Mar. 15, 1938 |
| 2,443,121 | Smith | June 8, 1948 |